United States Patent
Hager

[11] 3,762,572
[45] *Oct. 2, 1973

[54] TIRE TRAY CONSTRUCTION
[75] Inventor: Clarence H. Hager, Rockford, Ill.
[73] Assignee: Modern Caster Co., Inc., Rockford, Ill.
[*] Notice: The portion of the term of this patent subsequent to Aug. 1, 1989 has been disclaimed.
[22] Filed: Feb. 7, 1972
[21] Appl. No.: 224,086

Related U.S. Application Data
[63] Continuation-in-part of Ser. No. 100,102, Dec. 21, 1970, Pat. No. 3,680,710.

[52] U.S. Cl. .......................... 211/24, 108/2, 211/150
[51] Int. Cl. .......................... A47f 5/00, A47f 7/04
[58] Field of Search .................. 211/24, 23, 150, 211/169, 170, 168, 99, 49, 126, 47, 48, 82, 96–102, 110, 171, 172; 108/2, 136, 7; 248/292; 220/73

[56] References Cited
UNITED STATES PATENTS

| | | | |
|---|---|---|---|
| 1,501,829 | 7/1924 | Wright | 220/73 |
| 1,856,935 | 5/1932 | Turner | 211/150 X |
| 1,944,649 | 1/1934 | Smith | 211/150 X |
| 2,360,218 | 10/1944 | Gavin | 211/126 X |
| 2,563,212 | 8/1951 | Cole | 108/2 |
| 2,716,495 | 8/1955 | Prevette et al. | 211/150 X |
| 2,728,621 | 12/1955 | Kempter | 108/136 |
| 2,858,028 | 10/1958 | Hunting et al. | 211/126 |
| 2,952,434 | 9/1960 | Blanchard | 211/81 X |
| 3,390,784 | 7/1968 | Fuchs | 211/150 |
| 3,680,710 | 8/1972 | Hager | 211/24 |

Primary Examiner—Ramon S. Britts
Attorney—Vernon J. Pillote

[57] ABSTRACT

A mobile truck has a plurality of tire trays pivotally mounted thereon for movement between a generally horizontal position and a raised position. Each tray has a formed flange member at the front and a flared skirt at each side with an outwardly rolled edge at the bottom of the skirt. The rolled edge is provided with a plurality of aligned openings into which a bracket may be selectively inserted at various positions. The bracket is adapted for fastening to a spring which resiliently holds the tire tray in the raised position. By selectively positioning the bracket, the spring tension may be varied. A plurality of different brackets are provided each with openings spaced different distances in relation to the slots in the rolled edge to thereby give finer adjustment in varying the spring tension.

10 Claims, 6 Drawing Figures

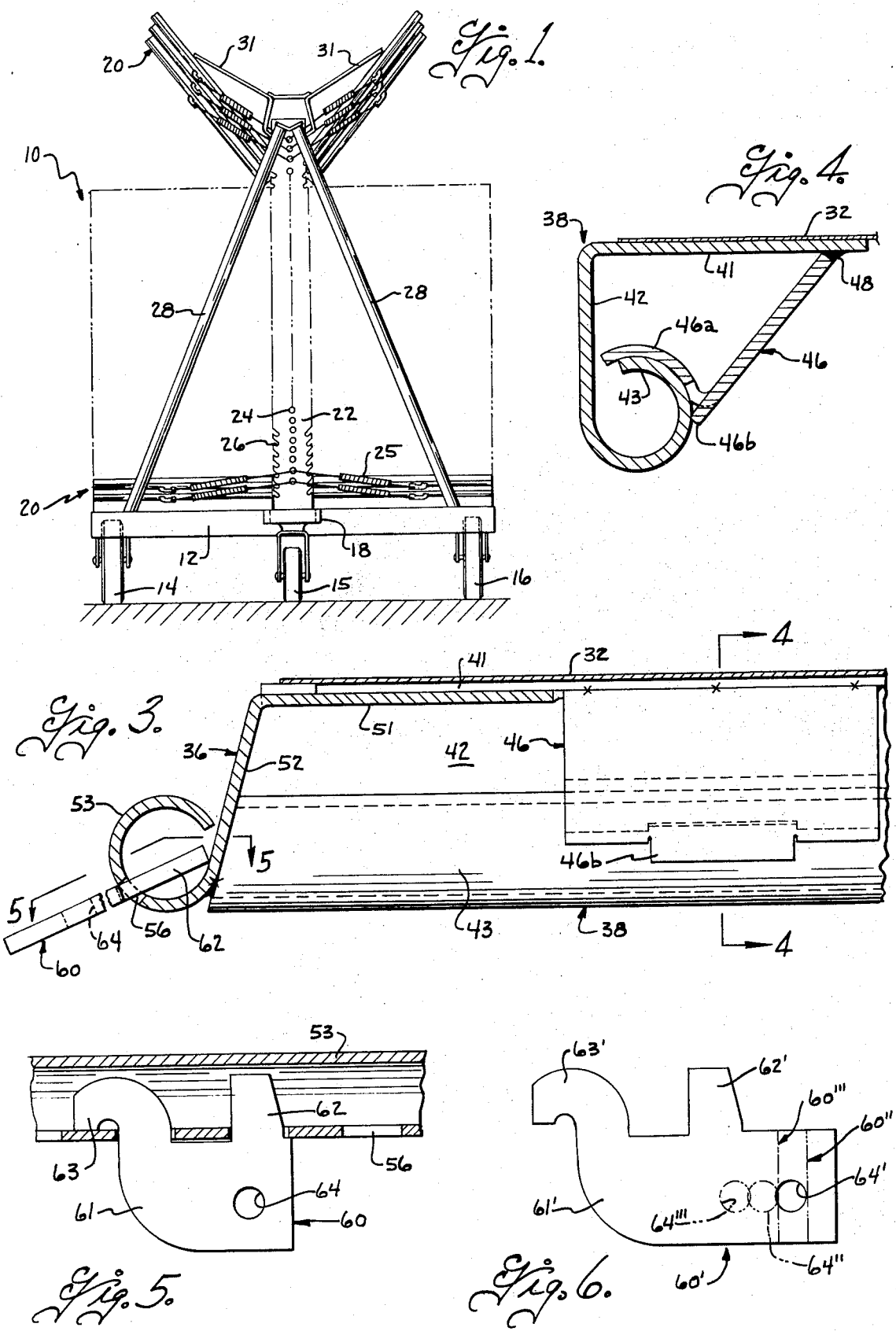

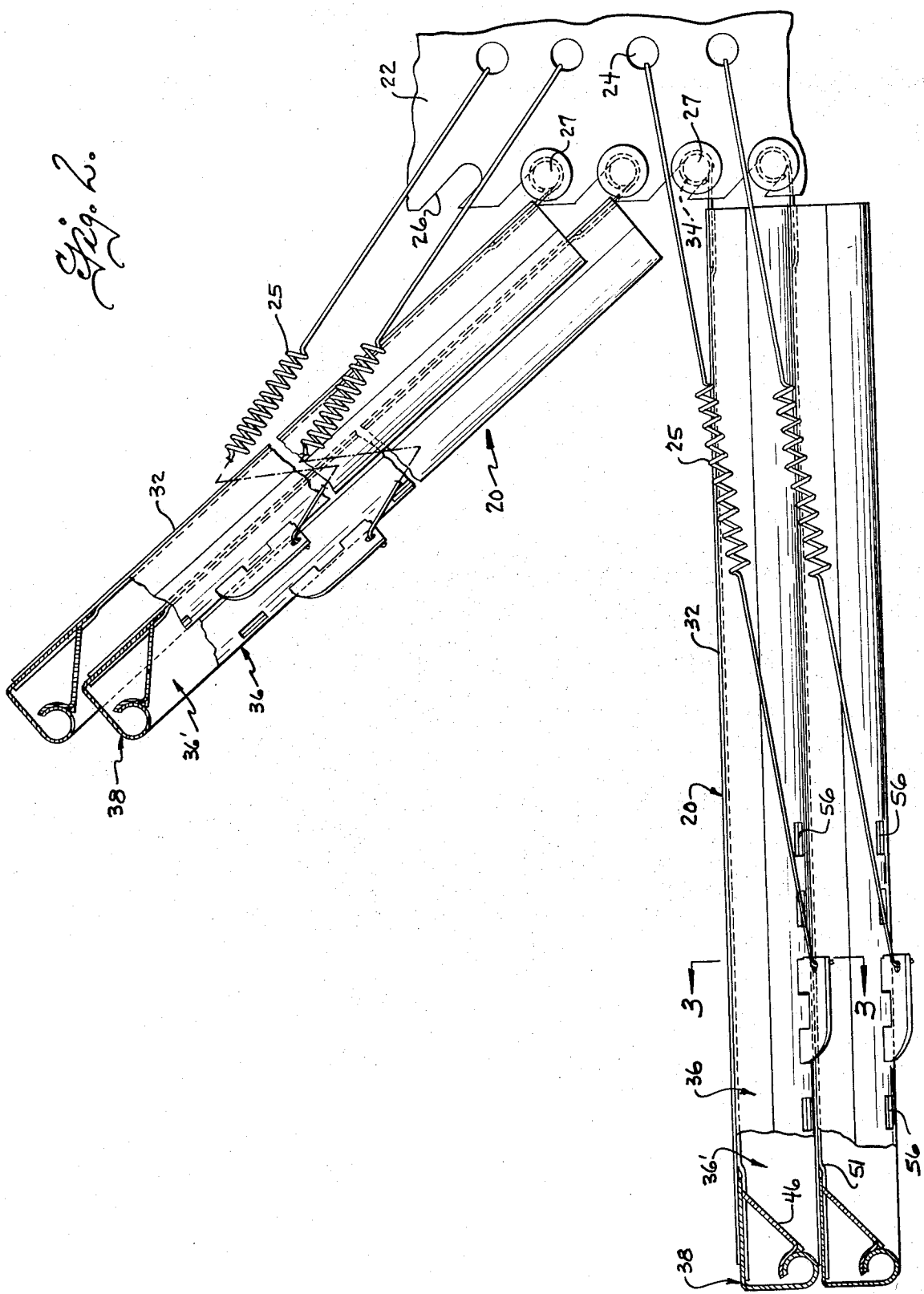

TIRE TRAY CONSTRUCTION

CROSS-REFERENCE

This is a continuation-in-part of application Serial No. 100,102, filed Dec. 21, 1970, now U.S. Pat. No. 3,680,710.

BACKGROUND

The invention pertains generally to supports or racks and more particularly to a tire tray construction.

It is presently common in automobile tire plants to transport the tread-forming blanks on trays carried by a truck to the point where the treads are assembled on the tire carcass. The tire trays are hingedly mounted on a support structure carried by the truck for swinging movement between a horizontal position and a raised position. The tire treads are carried on the top of the trays and the trays have a depth sufficient to accommodate the tire tread on the subjacent tray. As the treads are removed, the trays are swung to the raised position to allow access to the tread on the subjacent tray.

SUMMARY

The present invention relates generally to an improved support structure and more particularly to a tray construction, such as a tire tray construction, for use on a support having a plurality of trays swingably mounted thereon.

It is an object of the present invention to provide an improved tray construction for supporting objects such as tire treads.

Another object is to provide a tire tray construction having a formed flange member at the front with a rolled edge at the bottom for engaging the subjacent tray.

Still another object is to provide an apparatus in accordance with the foregoing object and having a diagonal bracket so formed that it need be only secured at one edge thereof.

Another object is to provide an apparatus in accordance with the foregoing and having a rolled edge at the rear of the tray to provide a hinge construction.

It is another object of the present invention to provide an improved tray construction for trays which are swingably mounted, in which spring tension may be readily adjusted.

Another object is to provide an apparatus in accordance with the foregoing object in which there is a bracket the position of which can be adjusted.

Yet another object is to provide an apparatus in accordance with the above two objects and having a flared skirt at the side edges, the skirt having an outwardly rolled edge at the bottom thereof.

These and other objects and advantages of the present invention will become apparent as the same becomes better understood from the following detailed description when taken in conjunction with the accompanying drawings.

DRAWINGS

FIG. 1 is an elevational view of a hand truck utilizing the tire tray construction of the present invention and showing some of the trays in their lower position and some of the trays in their raised position;

FIG. 2 on sheet 2 of the drawings, is a fragmentary elevational view of the embodiment in FIG. 1, on a much larger scale, and having portions broken away for a better illustration of the parts;

FIG. 3 is a partial cross-sectional view taken generally along line 3—3 of FIG. 2;

FIG. 4 is a cross-sectional view taken along line 4-4 of FIG. 3;

FIG. 5 is a fragmentary sectional view taken generally along line 5—5 of FIG. 3; and FIG. 6 is a plan view of an interchangeable bracket and showing other brackets in phantom lines.

DESCRIPTION

Reference is now made more particularly to the drawings which illustrate the best presently known mode of carrying out the invention and wherein similar reference characters indicate the same parts throughout the several views.

A mobile truck 10, which incorporates the present invention, is shown in FIG. 1. The truck includes a bed 12 supported by a plurality of wheels 14–16, at least one of which may be a caster type wheel such as wheel 15. A hitch 18 is conveniently provided at the front and rear sides of the bed. A plurality of trays, generally designated 20, are hingedly mounted on an upright support 22. The support has a plurality of centrally located openings 24 for holding one end of springs 25, and a plurality of slots 26 at the lateral edges thereof to receive hinge pins 27 (see FIG. 2). The support 22 may be braced in any convenient manner as, for example, by members 28. The identical support structure is found at both the front and rear of the bed. These structures are spaced to accommodate the tire trays 20 therebetween. As can be seen in FIG. 1, the tire trays are movable between a lower, horizontal position and a raised position, and the trays are resiliently held at the raised position by the springs 25. A stop 31 is provided for engaging the uppermost tire tray 20 in the raised position. The structure thus far described is conventional and additional description is deemed unnecessary.

The tire tray 20 includes a top wall 32 having a smooth upper surface for receiving the tire tread thereon and supported by a generally rectangular frame. The frame includes a rear member 34, side members 36, 36′ and a formed flange member 38 at the front. The rear frame member 34 is formed with a rolled edge (see FIG. 2) to receive the hinge pin 27 which supports the tire tray for the swinging movement.

The flange member 38 is best shown in FIG. 4 and includes an upper member 41 and a depending front member 42 having a rearwardly rolled edge 43 at its lower end. Rolled edge 43 is advantageously a right cylinder as can be seen in FIG. 4. Brace and guide members 46, conveniently three in number, are provided at spaced points across the length of the flange member 38. The brace and guide members 46 extend upwardly and rearwardly from the rolled edge 43. The brace and guide members are formed with an arcuate portion 46a that extends part way around the rolled edge, and a tongue 46b that is struck from the arcuate portion and extends generally tangential to the rolled edge 43. The upper edge of the brace members is secured, as by a weld 48, to the underside of the top member 41.

The rolled edge 43 has been provided at the front of the tire tray to minimize possible injury to the workman when removing the tire tread from the tray 20, as may occur if his hand strikes the lower edge of a superposed raised tray. In addition, the rolled edge 43 cooperates with the brace member 46 to aid in guiding the track back to a horizontal position when the nested, raised trays are subsequently pulled downwardly as is usually done prior to retransporting the truck. As best seen in FIG. 2, the inclined brackets 46 engage the front edge of the subjacent tray and serve as a ramp to guide the same downwardly when the top tray is forced toward the lower position. Thus it can be seen that the bracket 46 reinforces the flange member 38 but, because of its peculiar shape, need be secured at the top edge to perform this function. This is an obvious advantage in assembly of the tire trays 20. Additionally, the bracket 46 serves the function of a guide or ramp when the trays are simultaneously moved from their raised, nested position to the lower position.

The side member 36 is best shown in FIG. 3 and includes an upper member 51 and a skirt portion 52 having an outwardly rolled portion 53 at its lower end. The internal angle between the upper member 51 and the skirt portion 52 is greater than 90° and preferably about 105° to allow the trays to nest in the raised position, as shown in FIG. 2. The upper member 51 is contiguous with, and secured to the top wall 32, but it may be shaped to underlie upper member 41 of the flange member 38 and also rear member 34, as can be seen in FIG. 2. The outwardly rolled portion 53 provides a structural shape of greater rigidity and also provides a convenient handle for moving the trays between their positions.

The rolled portion 53 is advantageously cylindrical in shape and has a plurality of slots 56 therein. The slots 56 are spaced lengthwise of the cylindrical portion 53. The slots may be, for example, one-half inch in length and spaced one-half inch apart. A bracket 60 is provided for selective and adjustable mounting on the cylindrical portion. The bracket 60 includes a body portion 61 which is disposed outwardly of the cylindrical portion 53, a projection 62 which extends through one slot, and a hook portion 63 which extends through another slot and engages the back side of the cylindrical portion adjacent the slot, as seen in FIG. 5. It will be noted by reference to FIG. 3 that the inner extremity of projection 62 and hook portion 63 engages, and is supported by, the inside of the rolled portion 53. This position is assumed under tension of the spring 25, and the support provided by the rolled portion 53 properly positions the bracket 60. Bracket 60 is provided with an opening 64 for receiving one hook end of the spring 25. In use, the springs 25 may lose some of their resiliency. Thus, the tension can be varied by respositioning the bracket 60. Different length of springs can likewise be accommodated by the apparatus above-described.

With the above-described apparatus, the bracket 60, and thus the position of the opening 64, is selectively adjustable in increments of 1 inch. For finer adjustability, a plurality of brackets are advantageously provided. Referring to FIG. 6, there is shown a bracket 60' having parts similar to bracket 60, and like parts are indicated by the same numerals followed by the postscript prime ('). The difference is that bracket 60' has a body portion 61' which is longer than the corresponding body portion of bracket 60, and opening 64' is thereby spaced three-quarters of an inch away from the corresponding opening 64 when the projections 62', 63' are positioned through the identical openings illustrated in FIG. 5. Additional brackets 60", and 60''' are shown in phantom in FIG. 6 and have openings 64" and 64''' located respectively one-half inch and one-quarter inch from the position of opening 64. By the provision of four such brackets, openings may be provided at one-quarter inch intervals over the full range of location of the slots 56. Thus the spring tension can be varied accordingly. It is contemplated that means other than openings may be provided for attaching the spring 25 to the bracket.

It is now deemed obvious that the present invention provides an advantageous construction for trays that are swingably mounted in which spring tension may be readily and easily varied over a wide range, and in which the side edges have a rolled edge and openings to adjustably receive a bracket. The rolled side edges are arranged so that the trays nest in the raised position, and the rolled edge provides a handle for moving the trays to the horizontal position.

While a preferred embodiment of the invention has herein been illustrated and described, this has been done by way of illustration and not limitation, and the invention should not be limited except as required by the scope of the appended claims.

I claim:

1. A tire tray for use on a truck for transporting tire treads, the truck including a support and hinge means for swingably mounting a plurality of tire trays on the support for movement between a lower, generally horizontal position and a raised position, the tire tray comprising: a top wall having a smooth upper surface for receiving the tire tread thereon; a flange member at the front edge of the top wall to reinforce the top wall and to provide a leg for engaging the subjacent tire tray in the lower position; means at the rear edge of the top wall for engagement by the hinge means; a formed side member at each lateral side edge of the top wall to reinforce the same; each formed side member including an outwardly and downwardly extending skirt portion, means for securing the skirt portion to the top wall, and an outwardly rolled edge at the lower end of the skirt portion; a bracket; a spring extending from the bracket to the support for resiliently holding the tire tray in its raised position; and means for adjustably mounting the bracket on the rolled edge so that the spring tension can be varied by varying the position of the bracket.

2. A tire tray for use on a truck for transporting tire treads, the truck including a support and hinge means for swingably mounting a plurality of tire trays on the support for movement between a lower, generally horizontal position and a raised position, the tire tray comprising: a top wall having an upper surface for receiving the tire tread thereon; means at the front edge of the top wall to reinforce the top wall and to provide a leg for engaging the subjacent tire tray in the lower position; means at the rear edge of the top wall for engagement by the hinge means; a formed side member at each lateral side edge of the top wall to reinforce the same; each formed side member including an outwardly and downwardly extending skirt portion, means for securing the skirt portion to the top wall, and a rolled edge at the lower end of the skirt portion; the rolled edge having a plurality of spaced slots therein; a bracket mounted on the rolled edge of one side member; a spring extending from the bracket to the support for resiliently holding the tire tray in its raised position; and the bracket including a body portion, at least two spaced projections disposed at one side of the body portion for extending through the spaced slots, and one of the projections having a hook portion extending to a point beyond its respective slot and engaging the inside of the rolled edge adjacent the slot, whereby the bracket may be adjustably mounted on the rolled edge so the spring tension can be varied by varying the position of the bracket.

3. A tire tray as set forth in claim 2 including a plurality of means for attaching the spring to the bracket spaced different distances from the support when the bracket is disposed through selected spaced slots, whereby the spring tension can be varied.

4. A tire tray as set forth in claim 3 wherein the last-mentioned means includes a plurality of brackets, each with an attaching opening therein and each bracket opening being located a different distance with respect to the projections for selectively varying the spring tension.

5. A tire tray as set forth in claim 2 wherein the rolled edge at the lower end of the skirt portion is an outwardly rolled edge; and wherein the plurality of spaced slots are located outwardly of the skirt portion.

6. A tire tray as set forth in claim 5 wherein the skirt portion extends outwardly an amount sufficient to allow the trays to nest in raised position, but with the outwardly rolled edge exposed to provide a handle for moving the tire tray to its horizontal positon.

7. A tire tray as set forth in claim 6 wherein the means at the front edge to reinforce the top wall and to provide a leg includes an upper portion underlying the top wall and attached thereto, a depending front portion, and a rearwardly rolled edge at the lower end of the front portion to present a smooth surface for engaging the subjacent tire tray; and including a diagonal bracket extending between the rearwardly rolled edge and the underside of the tire tray.

8. A tray for use on a support which includes a frame and means for swingably mounting a plurality of trays on the frame for movement between a horizontal position and a raised position at an angle to the horizontal, the tray comprising: a top wall having front, rear and side edges; a depending leg at the front edge for engaging a subjacent tray; said leg extending substantially across the entire front edge of the tray; a formed side member at each side edge of the top wall; each formed side member including an outwardly and downwardly extending skirt portion, means for securing the skirt portion to the top wall, and a cylindrical portion at the lower end of the skirt portion; said cylindrical portion having a plurality of slots therein spaced lengthwise of the cylindrical portion; a bracket adjustably mounted on the cylindrical portion and including: a body portion disposed outwardly of the cylindrical portion, and projection means extending through at least one slot and engaging the inside of the cylindrical portion; and a spring extending from the bracket to the frame and connected to both for resiliently holding the tray in the raised position; whereby the bracket may be adjustably positioned on the cylindrical portion so the spring tension can be varied accordingly.

9. The combination of claim 8 including a plurality of brackets, each with an opening therein for attachment to the spring, and each bracket opening being located a different distance with respect to the projection means for selectively varying the spring tension.

10. The combination of claim 8 wherein the depending leg at the front edge is perpendicular to the top wall and has a cylindrical portion at the lower end thereof, the cylindrical portion at the front edge being located rearwardly of the depending leg; and the cylindrical portion at each side edge being located outwardly of the skirt portion.

* * * * *